United States Patent [19]

Ashizawa et al.

[11] Patent Number: 5,576,956
[45] Date of Patent: Nov. 19, 1996

[54] AUXILIARY STEERING ANGLE CONTROL SYSTEM FOR VEHICLE

[75] Inventors: Hiroyuki Ashizawa; Kazutaka Adachi, both of Yokohama, Japan

[73] Assignee: Nissan Motor Co., Ltd., Yokohama, Japan

[21] Appl. No.: 340,403

[22] Filed: Nov. 15, 1994

[30] Foreign Application Priority Data

Nov. 16, 1993 [JP] Japan ................................ 5-286873

[51] Int. Cl.$^6$ .................................................. B62D 6/00
[52] U.S. Cl. .................................. 364/424.05; 280/91.1; 180/410; 73/105
[58] Field of Search ........................ 364/424.01, 424.05; 180/79.1, 140–143; 280/91, 707; 73/105, 146

[56] References Cited

U.S. PATENT DOCUMENTS

| | | | |
|---|---|---|---|
| 4,679,808 | 7/1987 | Ito et al. | 364/424.01 |
| 4,690,431 | 9/1987 | Ito et al. | 280/91 |
| 4,733,878 | 3/1988 | Kanazawa et al. | 280/91 |
| 4,757,870 | 7/1988 | Torii et al. | 364/424.05 |
| 4,837,727 | 6/1989 | Tashiro et al. | 364/424.05 |
| 4,842,089 | 6/1989 | Kimbrough et al. | 364/424.01 |
| 4,878,557 | 11/1989 | Shibahata et al. | 364/424.05 |
| 4,941,097 | 7/1990 | Karnopp et al. | 364/424.05 |
| 4,984,163 | 1/1991 | Kuwana et al. | 73/105 |
| 5,001,636 | 3/1991 | Shiraishi et al. | 364/424.05 |
| 5,373,911 | 12/1994 | Yasui | 364/424.05 |

FOREIGN PATENT DOCUMENTS

| | | |
|---|---|---|
| 3930445 | 3/1990 | Germany . |
| 4133238 | 4/1993 | Germany . |
| 61-37515 | 2/1986 | Japan . |
| 62-247979 | 10/1987 | Japan . |

*Primary Examiner*—Gary Chin
*Attorney, Agent, or Firm*—Lowe, Price, Leblanc & Becker

[57] ABSTRACT

An auxiliary steering angle control system for a vehicle comprises a vehicle condition detecting section for detecting a vehicle condition, a desired motion variable calculating section for calculating a desired value of the motion variable actually generated to the vehicle from the detected vehicle condition, an actual motion variable detecting section for detecting an actual motion variable actually generated in the vehicle, an auxiliary steering angle feedback control-input determining section for determining an auxiliary steering feedback control-input according to the difference between the desired motion variable and the detected actual-vehicle motion variable, a road condition detecting section for detecting a road variable indicative of a condition of a road on which the vehicle is traveling, and an auxiliary steering feedback control-input correcting section for reducing the auxiliary steering angle feedback control-input when the road condition detecting section outputs a signal indicative that the vehicle is traveling on a bad-conditioned road.

10 Claims, 9 Drawing Sheets

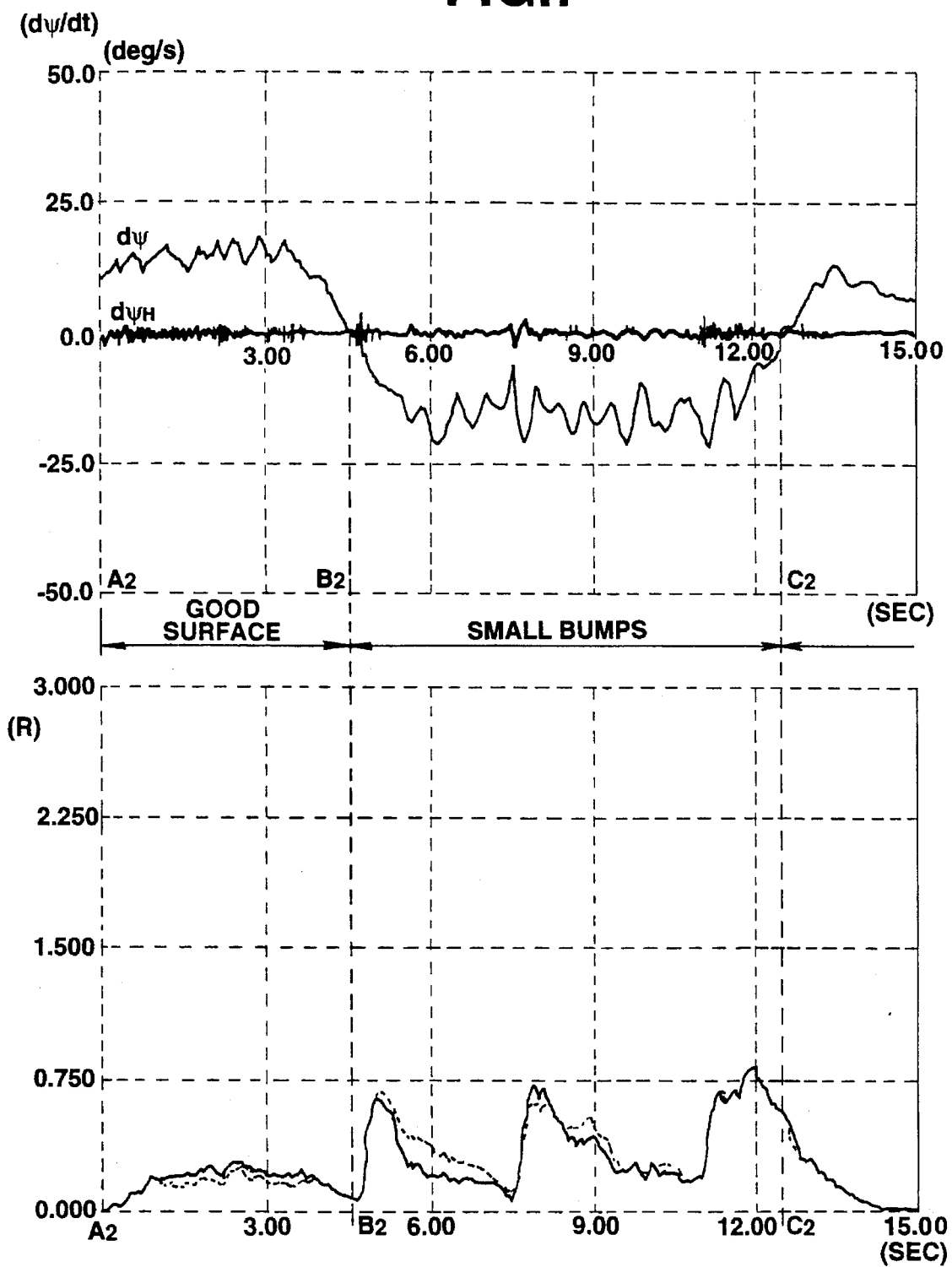

AUXILIARY STEERING ANGLE CONTROL SYSTEM FOR VEHICLE

BACKGROUND OF THE INVENTION

1. Field of the Invention

The present invention relates to improvements in an auxiliary steering angle control system for a wheeled vehicle, and more particularly to an auxiliary steering angle control system which executes an auxiliary steering angle control with a feedback compensation.

2. Description of the Prior Art

Various auxiliary steering angle control systems for vehicles have been proposed and in practical use. Japanese Patent Provisional Publication No. 62-247979 discloses a typical auxiliary steering angle control system where an auxiliary steering control is executed by applying a feedback control and a feed-forward control to a vehicle motion variable.

However, such a conventional auxiliary steering angle control system is arranged to execute the feedback control during a vehicle running condition regardless of a road condition. Therefore, in case that the road condition is suddenly changed from a bad-conditioned surface such as a bumpy road to a good-conditioned surface, unexpected vehicle motion variable is occurred in the vehicle and impresses a strange feeling to a driver. That is, in case that the vehicle is traveling on an extremely bad-conditioned (bumpy) road, the tire contact area on a road surface is decreased. Accordingly, the cornering force of the tires is decreased and therefore the yaw rate generated by the steering operation becomes difficult to be change.

SUMMARY OF THE INVENTION

It is an object of the present invention to provide an improved auxiliary steering angle control system which applies a suitable steering feeling to a driver even during a traveling on a road having a variously changing surface.

Another object of the present invention is to provide an auxiliary steering angle control system which includes an advantageous road condition detecting means.

According to the present invention, an auxiliary steering angle control system for a vehicle comprises a vehicle condition detecting means, a desired vehicle motion variable calculating means, an actual vehicle motion variable detecting means, an auxiliary steering angle feedback control-input determining means, a road condition detecting means and an auxiliary steering feedback control-input correcting means. The vehicle condition detecting means detects a vehicle condition. The desired vehicle motion variable calculating means calculates a desired value of the vehicle motion variable actually generated to the vehicle from the detected vehicle condition. The actual vehicle motion variable detecting means detects an actual vehicle motion variable actually generated in the vehicle. The auxiliary steering angle feedback control-input determining means determines an auxiliary steering feedback control-input according to the difference between the desired vehicle motion variable and the detected actual vehicle motion variable. The road condition detecting means detects a road variable indicative of a condition of a road on which the vehicle is traveling. The auxiliary steering feedback control-input correcting means reduces the auxiliary steering angle feedback control-input when the road condition detecting means outputs a signal indicative that the vehicle is traveling on a bad-conditioned road.

BRIEF DESCRIPTION OF THE DRAWINGS

FIG. 7 is a characteristic chart similar to that of FIG. 6 in another road condition;

DETAILED DESCRIPTION OF THE INVENTION

Figure 1:
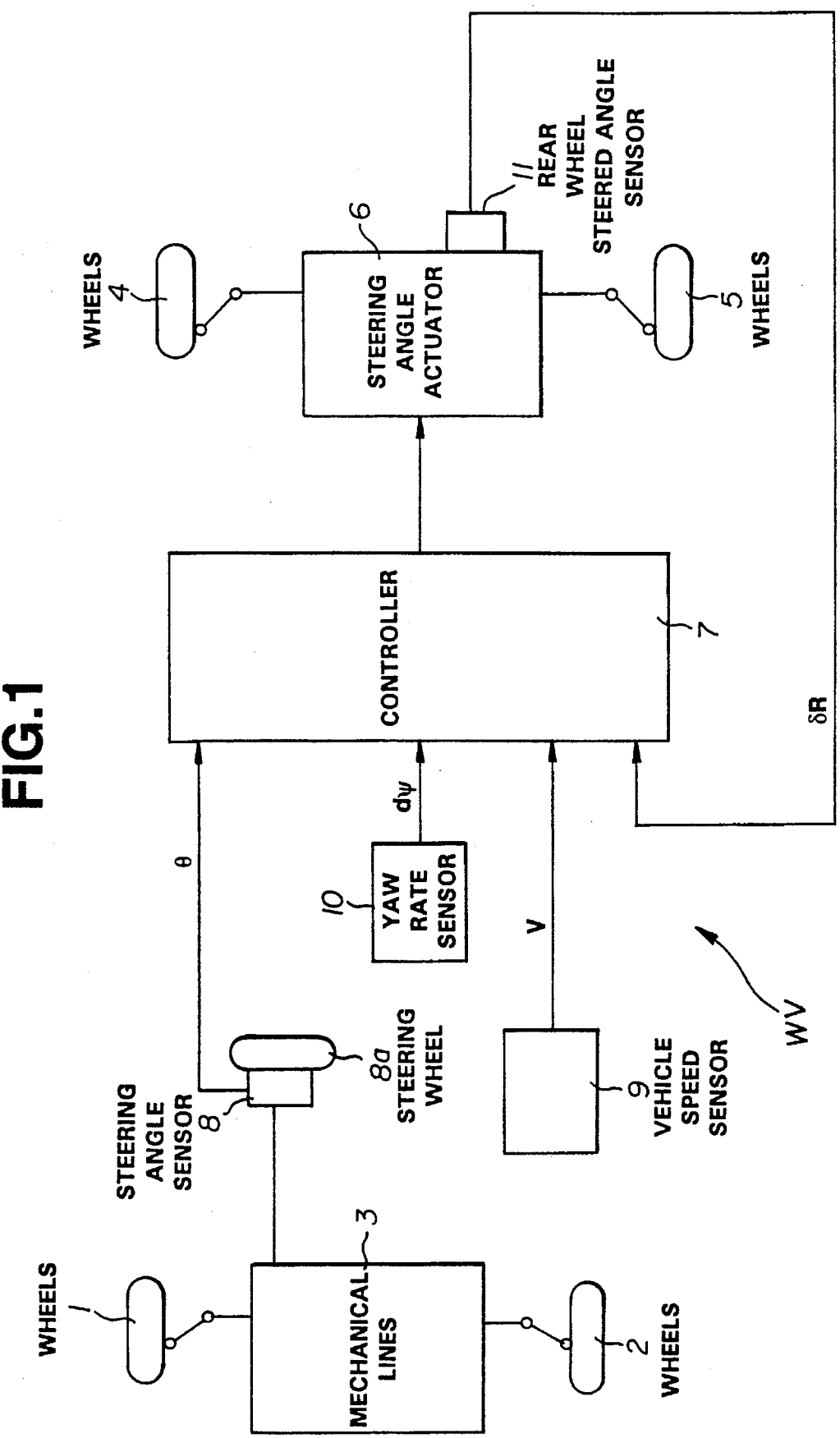
FIG. 1 is a schematic structural view of a four-wheel steering vehicle where an auxiliary steering angle control system according to the present invention is applied.

Referring now to FIGS. 1 to 9, there is shown an embodiment of an auxiliary steering angle control system according to the present invention. FIG. 1 shows a schematic structural view of a wheeled vehicle WV to which the auxiliary steering control system is applied.

As shown in FIG. 1, the auxiliary steering angle control system for the wheeled vehicle WV, such as an automotive vehicle, comprises a steering angle actuator 6, a controller 7, steering angle sensor 8, a vehicle speed sensor 9, and a yaw rate sensor 10, and a rear wheel steered angle sensor 11.

The wheeled vehicle WV is provided with a pair of front wheels 1 and 2 which are steered by a driver through a steering wheel 8a and a mechanical link type steering device 3. Further, a pair of rear wheels 4 and 5 are steered by an electrically controlled steering angle actuator 6. Each of the wheels 1, 2, 4 and 5 is provided with a tire directly in contact with a road surface.

The controller 7 is constituted by a micro-computer or electrical circuits. The controller 7 receives a signal indicative of a steering angle $\theta$ of the front wheels 1 and 2 from the steering angle sensor 8, a signal indicative of a vehicle speed V from the vehicle speed sensor 9, a signal indicative of a yaw rate $d\psi$ from a yaw rate sensor 10, and a signal indicative of an actual rear wheel steered angle $\delta R$. Upon receipt of these signals, the controller 7 executes predetermined calculating operations for obtaining a desired auxiliary steering angle control-input $\delta REF$ by which the steering angle of the rear wheels 4 and 5 are controlled. Then, the controller 7 outputs a drive command to the auxiliary steering angle actuator 6 so as to set the steering angle of the rear wheels 3 and 4 to the determined steering angle.

Figure 2:
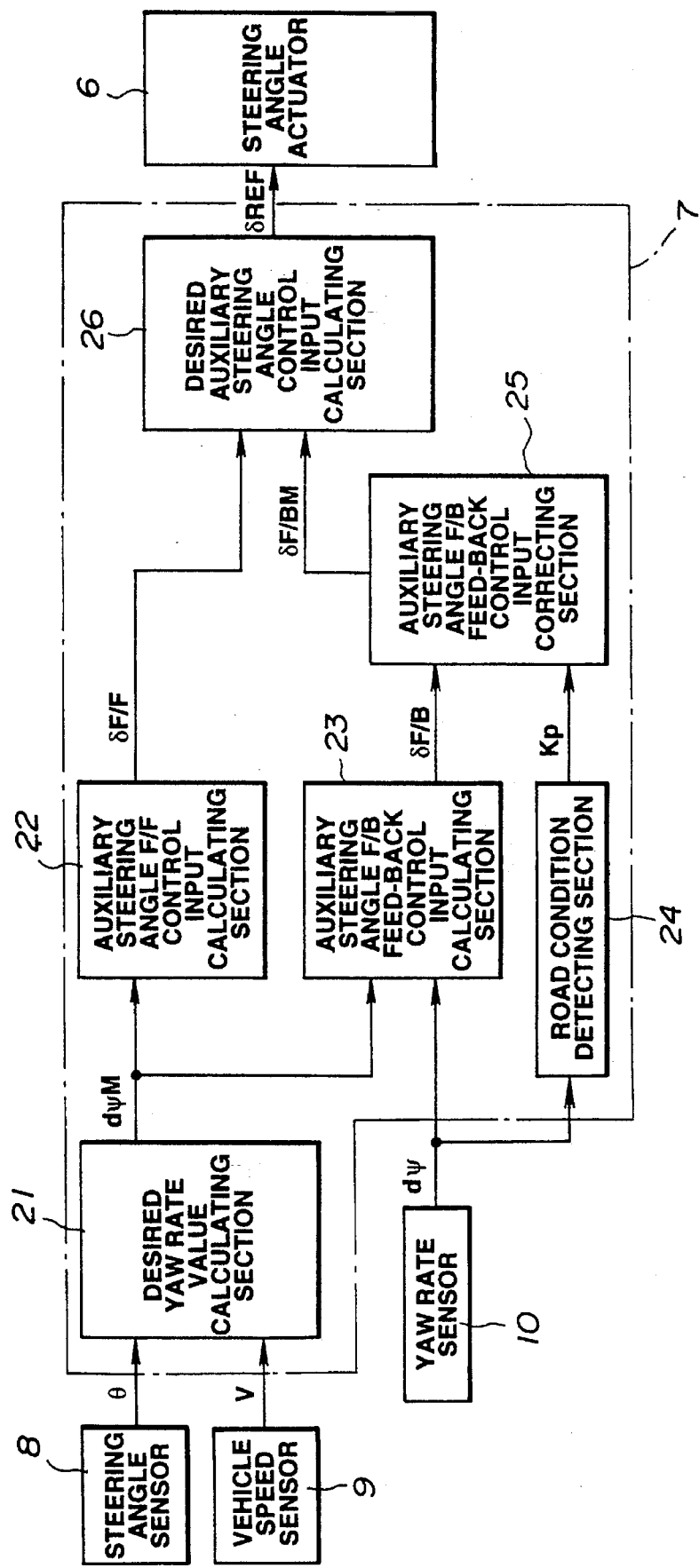
FIG. 2 is a block diagram showing an electronic system of the control system to the present invention.

FIG. 2 shows a block diagram of operations executed by the controller 7. The controller 7 includes a desired yaw rate calculating section 21, an auxiliary steering angle feed-forward control-input calculating section 22, an auxiliary steering angle feedback control-input calculating section 23, a road condition detecting section 24, an auxiliary steering angle feedback control-input correcting section 25 and a desired auxiliary steering angle control-input calculation section 26.

The manner of operation of the auxiliary steering angle control apparatus according to the present invention will be discussed hereinafter.

Figure 3:
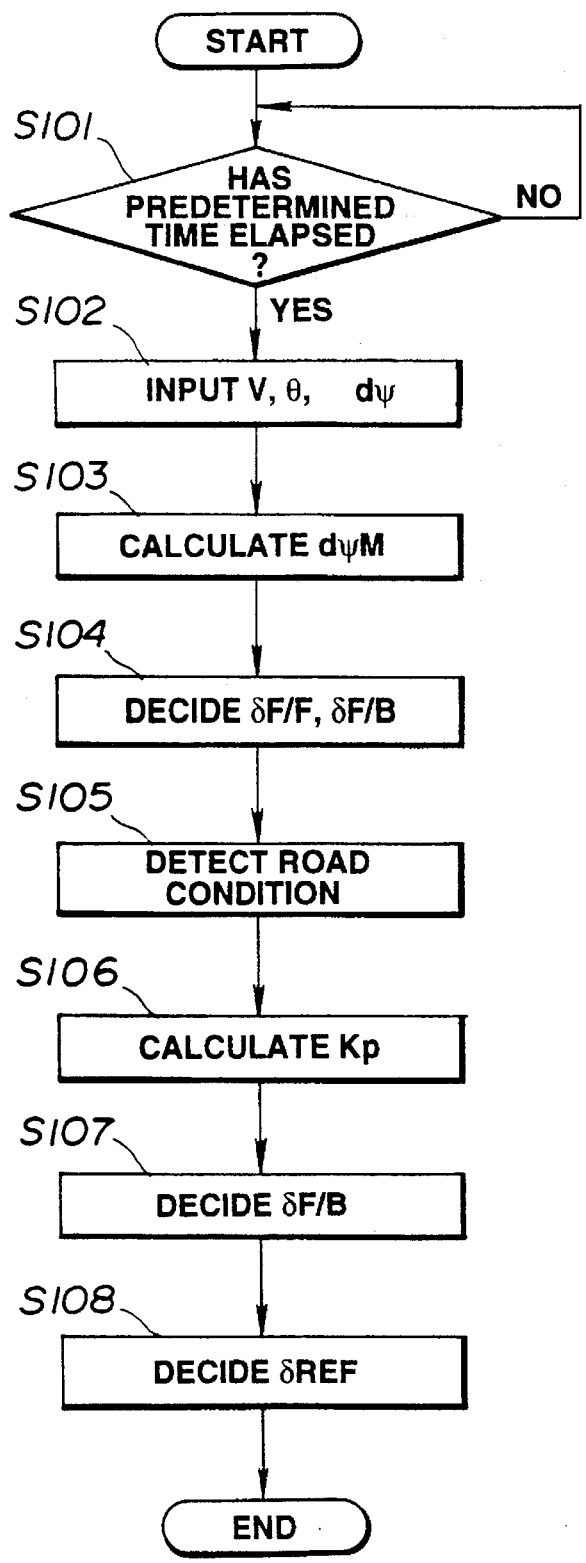
FIG. 3 is a flow chart which shows a procedure of the rear wheel steering angle control by a controller of the auxiliary steering angle control system according to the present invention.

FIG. 3 shows a flow chart which shows a procedure of a rear wheel steering angle control executed by the controller 7.

In a step S101 the controller 7 judges whether a predetermined time period corresponding to a control preparing time period has elapsed or not. When an answer in the step S101 is NO, the routine repeats the step S101. When the answer is YES, the routine proceeds to a step S102 wherein the controller 7 receives the signal indicative of the steering angle θ of the steering wheel 8a from the steering angle sensor 8, the signal indicative of the vehicle speed V from the vehicle speed sensor 9 and the signal indicative of the yaw rate dψ from the yaw rate sensor 10.

In a step S103 the desired yaw rate calculating section 21 of the controller 7 calculates the desired yaw rate dψM functioning as a desired vehicle motion variable according to the inputted signals in the step S102.

In a step S104 the auxiliary steering angle feed-forward control-input calculating section 22 of the controller 7 calculates an auxiliary steering angle feed-forward control-input δF/F which is a feed-forward value for the desired yaw rate, according to the output from the desired yaw rate calculating section 21. Further, the auxiliary steering angle feed-back control-input calculating section 23 of the controller 7 calculates an auxiliary steering angle feedback control-input δF/B upon obtaining a difference e=|dψM−dψ| from the desired yaw rate dψ M and the generated yaw rate dψ.

In a step S105 the road condition detecting section 24 of the controller 7 calculates a road variable R from the generated yaw rate dψ. The road variable R indicates a degree of a bumpiness of the road surface.

In a step S106 the road condition detecting section 24 of the controller 7 calculates a correction factor Kp for correcting the auxiliary feedback control-input δF/B by using the road variable R.

In a step S107 the auxiliary steering angle feedback control-input correcting section 25 of the controller 7 calculates the correction value δF/BM for the auxiliary steering angle control-input from the auxiliary steering angle feedback control-input δF/B and the correction factor Kp.

In a step S108 the desired auxiliary steering angle control-input calculating section 26 of the controller 7 calculates the desired auxiliary steering angle control-input δREF by adding the correction value δF/BM to the auxiliary steering angle feed-forward control-input δF/F (δREF=δF/F+δF/BM). Further, the desired auxiliary steering angle control-input calculating section 26 outputs a drive command to the steering angle actuator 6 so as to apply the calculated desired auxiliary steering angle control-input δREF to the rear wheels 4 and 5.

Next, a method for detecting a road condition which method is applied to the auxiliary steering control system according to the present invention will be discussed.

In case that the wheeled vehicle WV is traveling on a bad-conditioned road, the generated yaw rate dψ detected by the yaw rate sensor 10 includes a lot of signals indicative of high-frequency component dψH whose degree is larger than that in case of the traveling on a well-conditioned road. Accordingly, it is possible to judge the road condition from the high-frequency component dψH of the generated yaw rate dψ. The road condition detecting section 24 judges the road condition from the high-frequency component dψH which is extracted from the generated yaw rate dψ. Generally, as an extracting means of the high-frequency component, for example, a high-pass filter which is expressed by the following equations (1) and (2) is known.

$$GH(s)=S^2/(s^2+2\zeta\omega_n s+\omega_n^2) \quad (1)$$

$$d\psi H(s)=GH(s)\cdot d\psi(s) \quad (2)$$

where $\zeta$ is a damping factor, $\omega_n$ is a cut-off frequency, and s is Laplace operator.

Furthermore, the road condition detecting section 24 calculates the road variable R and decides the correction factor Kp according to the obtained road variable R. One of method for obtaining the road variable R is a so-called square-integration of dψH which is derived from the following equations.

In a condition dψH>dψth, $$\text{if } R(n-1)<R_{LMT}, R(n)=\Sigma(d\psi H)^2 \quad (3)$$

$$\text{if } R(n-1)=R_{LMT}, R(n)=R(n-1) \quad (4)$$

In a condition dψH<dψth, $$\text{if } R(n-1)>0, R(n)=R(n-1)-C1 \quad (5)$$

$$\text{if } R(n-1)=0, R(n)=R(n-1) \quad (6)$$

where dψth is a threshold value, $R_{LMT}$ is an upper limit of the road variable, n is a present time, and C1 is a constant.

Further, a calculating method of the road variable R may be a method of filtering the square of dψH by the following equation (7):

$$G_L(s)=1/(\tau s+1) \quad (7)$$

where τ is a filter time constant, and s is Laplace operator.

Figure 5:
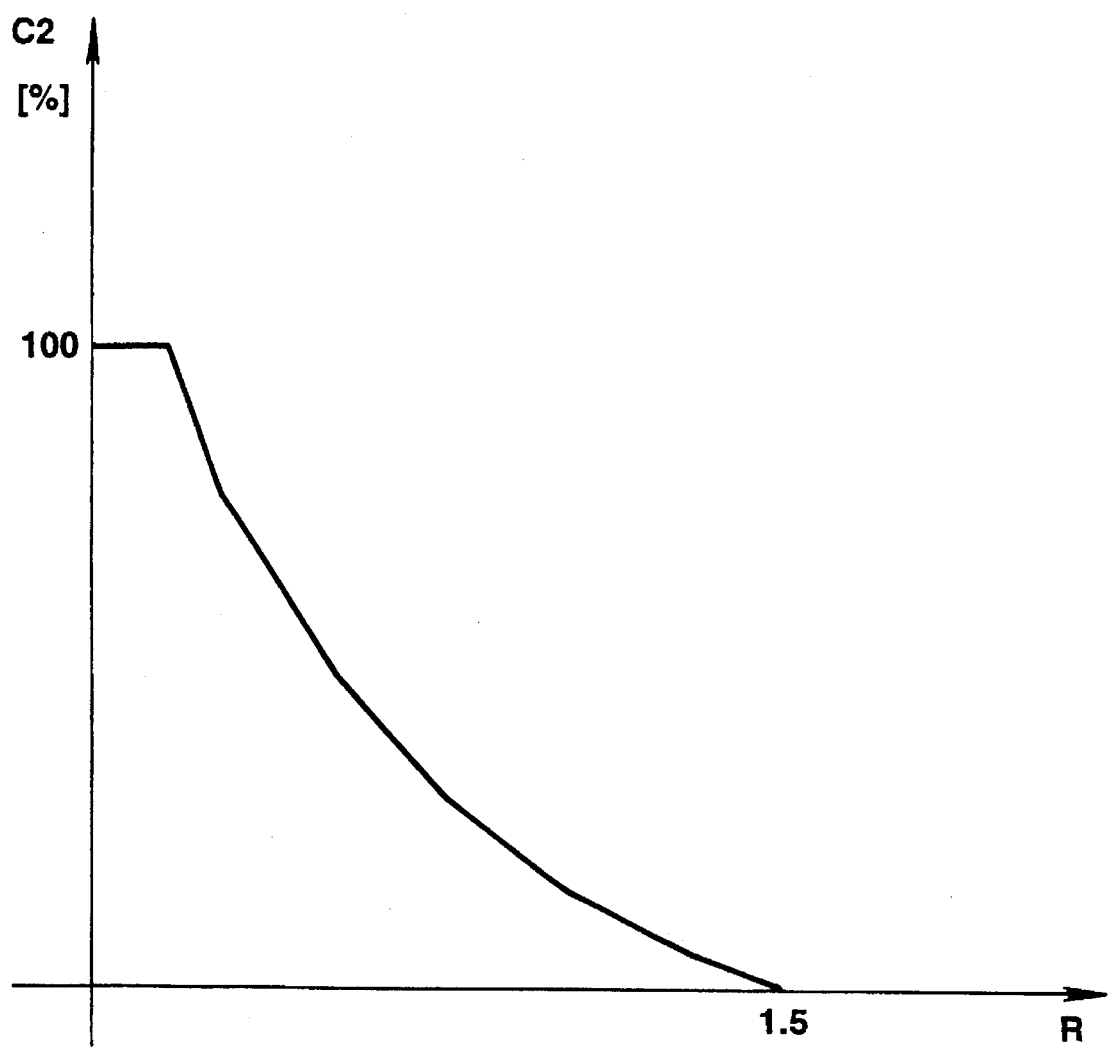
FIG. 5 is a map for obtaining the correction factor with respect to a road condition variable.

Further, a value C2 is determined from the calculated road variable R and a map shown in FIG. 5. Then, the correction factor Kp for correcting the auxiliary steering angle feed-back control-input dF/B is determined by the following equation.

$$Kp=C2* \text{ (constant)} \quad (8)$$

Figure 4:
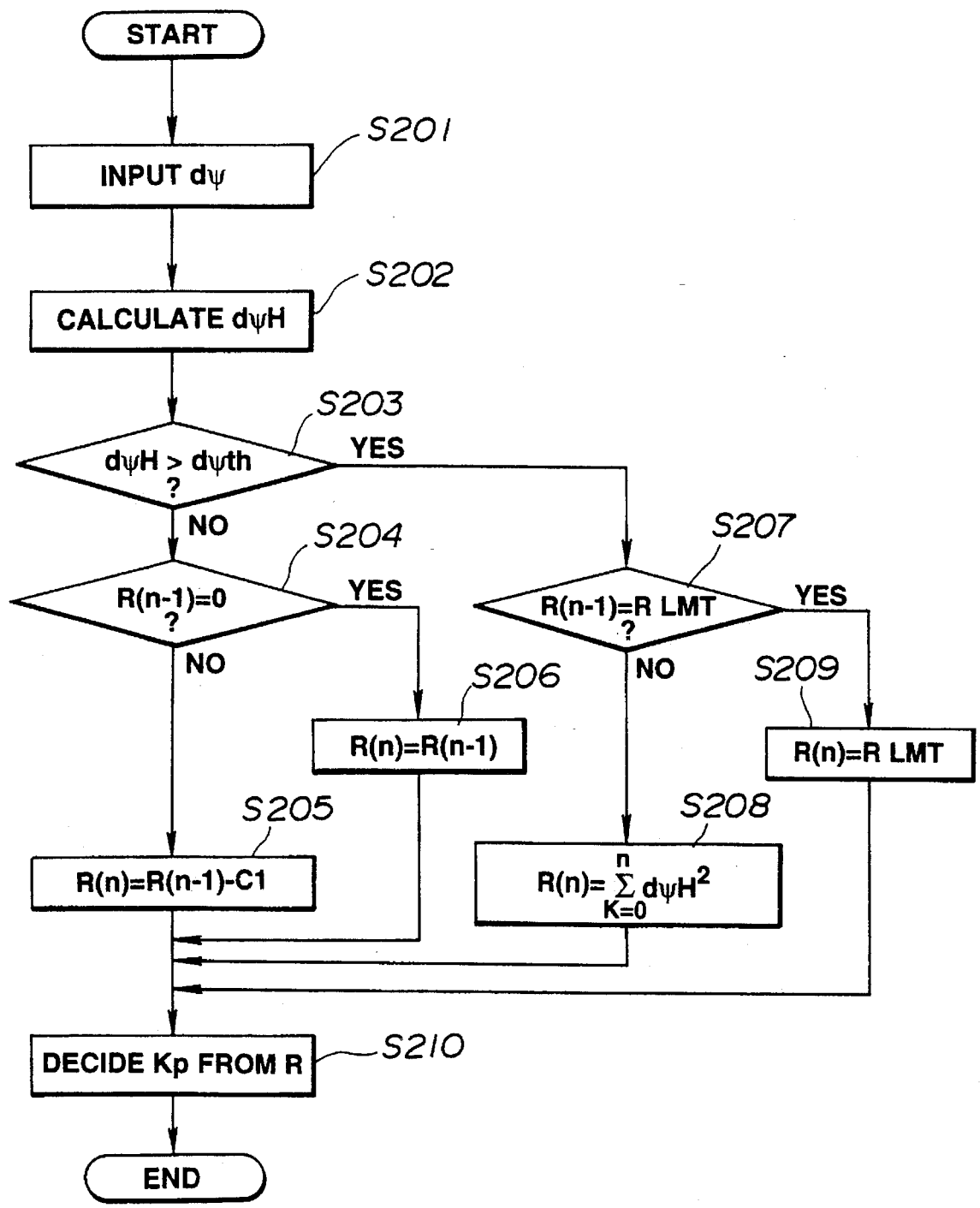
FIG. 4 is a flow chart which shows a procedure of the calculation of a vehicle motion variable and a correction factor.

The above method for calculating the road variable R and the correction factor Kp is corresponding to the steps S105 and S106, and a flow chart of FIG. 4 shows a procedure thereof.

In a step S201 the controller 7 receives the generated yaw rate dψ detected by the yaw rate sensor 10.

In a step S202 the controller 7 derives the high-frequency component dψH of the generated yaw rate dψ from the above equations (1) and (2).

In a step S203 the controller 7 judges whether dψH>dψth or not. If the answer in the step S203 is YES, the routine proceeds to a step S207. If the answer is NO, the routine proceeds to a step S204 wherein it is judged whether $R(n-1)=0$ or not. If the answer in the step S204 is YES, the routine jumps to a step S206 wherein the equation (4) is applied to the derivation of the road variable R ($R(n)=R(n-1)$). If the answer is NO, the routine proceeds to a step S205 wherein the equation (5) is applied to the derivation of the road variable R ($R(n)=R(n-1)-C1$).

In the step S207 the controller judges whether $R(n-1)=R_{LMT}$ or not. If the answer in the step S207 is NO ($R(n-1)<R_{LMT}$), the routine proceeds to a step S208 wherein the equation (3) is applied to the derivation of the road variable R ($R(n)=\Sigma(d\psi H)^2$). If the answer is YES, the routine proceeds to a step S209 wherein the equation (4) is applied to the derivation of the road variable $R(R(n)=R_{LMT})$.

In a step S210 the correction factor Kp is determined from the road variable R calculated in one of the steps S205, S206, S208 and S209, the map shown in FIG. 5, and the equation (8).

Figure 6:
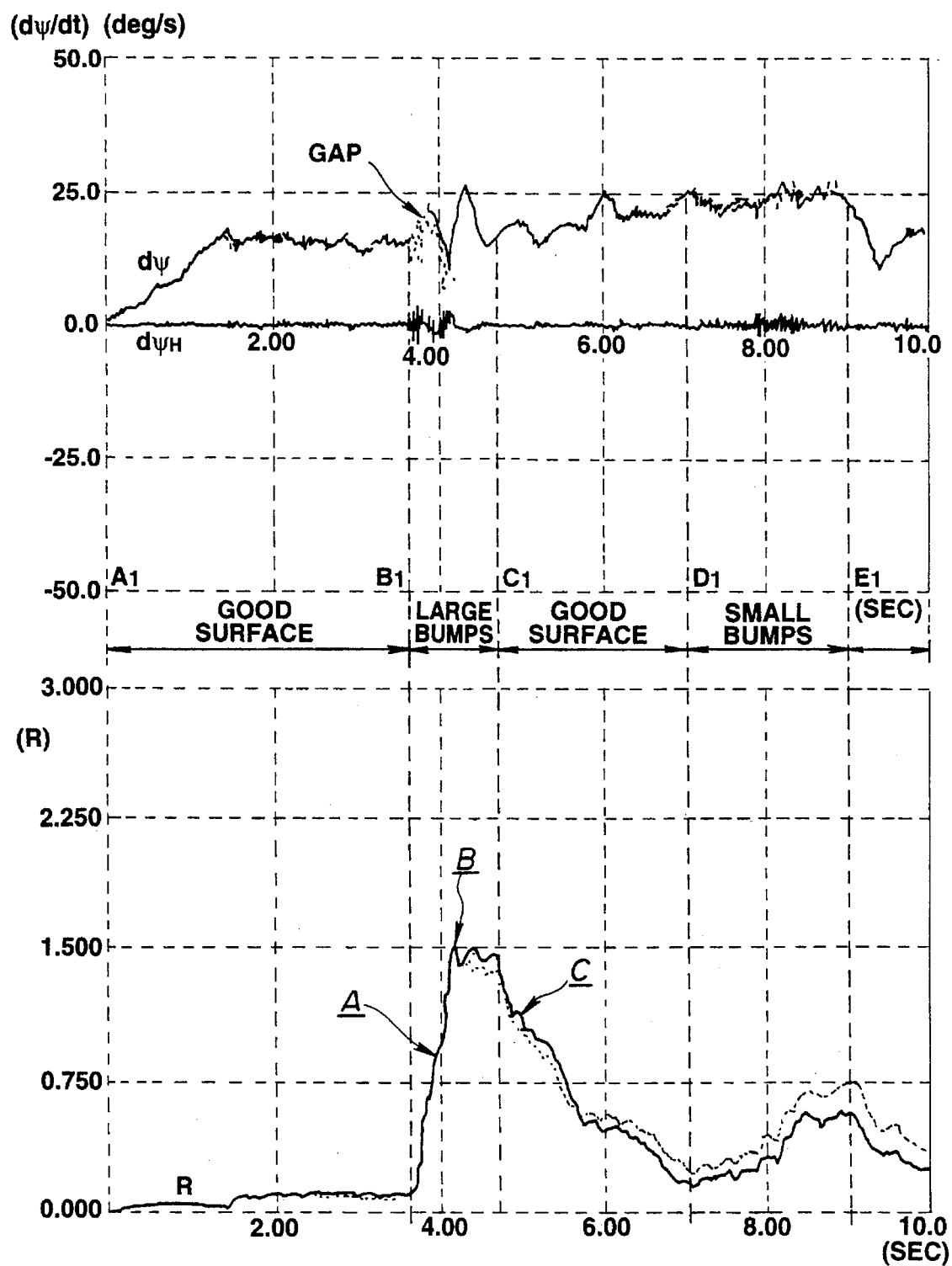
FIG. 6 is a characteristic chart of the vehicle motion variable, a generated yaw rate and a high frequency component thereof which are the result of an actual traveling of a road.

FIGS. 6 and 7 show characteristics charts where the generated yaw rate $d\psi$ which was detected during an actual traveling of the vehicle, the high-frequency component $d\psi H$ which has been filtered by a digital high-pass filter, and the road variable R calculated by the method shown in FIG. 4.

In FIGS. 6 and 7 the road condition actually traveled by the vehicle was changed as shown in the following table 1.

TABLE 1

Figure 8A:
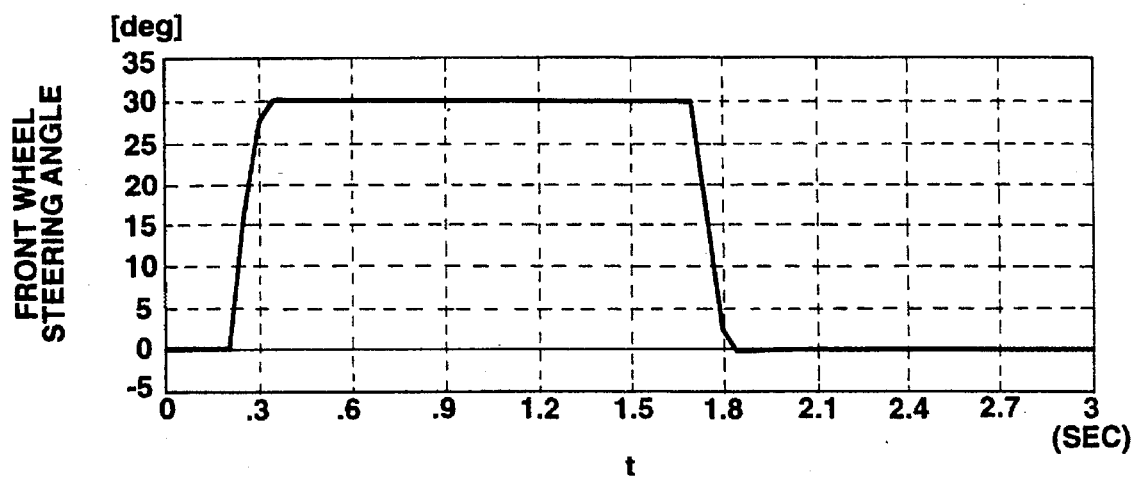
FIGS. 8A and 8B are a characteristic chart of a front wheel steering angle and a yaw rate generated by disturbance which are a preset condition for a simulation of the vehicle.
Figure 8B:
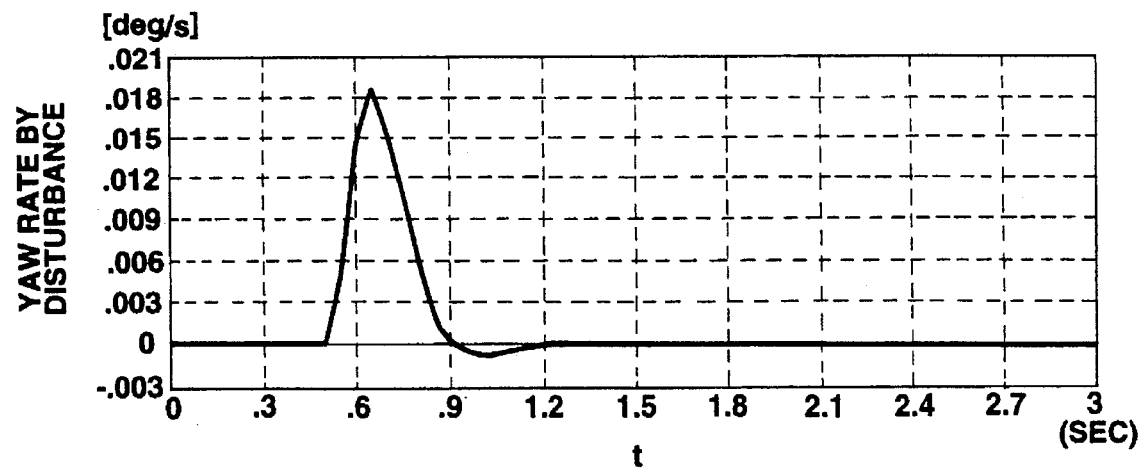

|  | INTERVAL | ACTUAL ROAD CONDITION | CALCULATED QUANTITY OF ROAD CONDITION |
| --- | --- | --- | --- |
| FIG. 7 | A1 to B1 | good-conditioned road | micro value |
|  | B1 to C1 | bad-conditioned road of large bumps | increase (peak value 1.5) |
|  | C1 to D1 | good-conditioned road | decrease |
|  | D1 to E1 | bad-conditioned road of small bumps | increase (peak value 0.6) |
| FIG. 8 | A2 to B2 | bad conditioned road of small bumps | increase (peak value 0.3) |
|  | B2 to C2 | bad-conditioned road of scattered small bumps | several peaks (0.6–0.8) |

In FIG. 6, at A point the road variable R is increasing according to the equation (3). At B point the road condition is kept at an upper limit according to the equation (4). At C point the road condition R is decreasing according to the equation (5). These charts was derived from the experiment using the detected actual values, and indicates that it is possible to judge the road condition by means of the rod condition detecting section 24.

Next, the result of the simulation will be discussed.

FIG. 8 shows characteristic charts of a front wheel steering characteristic and the yaw rate generated by the disturbance which are a preset condition for the simulation. Further, in this simulation, it was assumed that the vehicle travels on bumpy road by which the contact area of the tires is decreased during a turning.

Figure 9A:
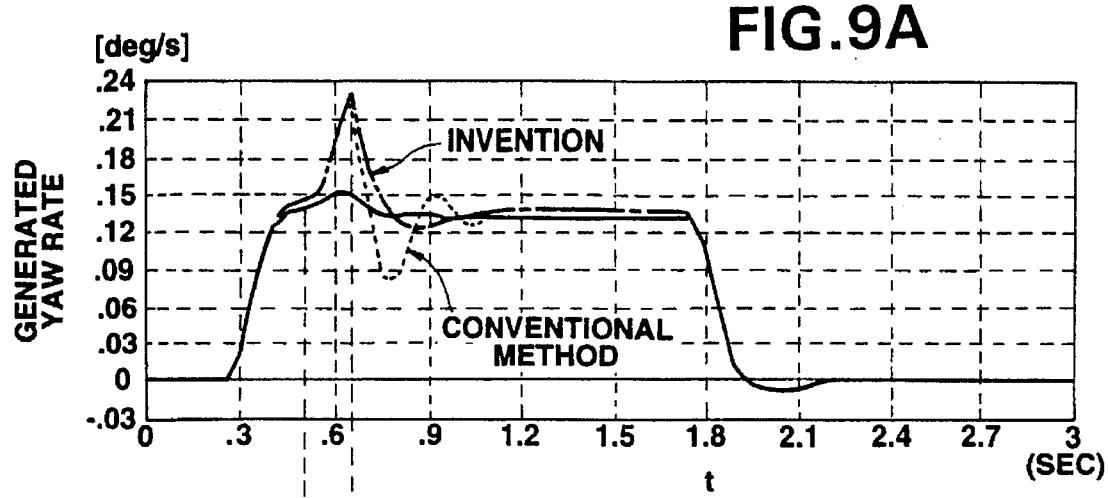
FIGS. 9A and 9B are characteristic chart which shows a result of the simulation of FIGS. 8A and 8B.
Figure 9B:
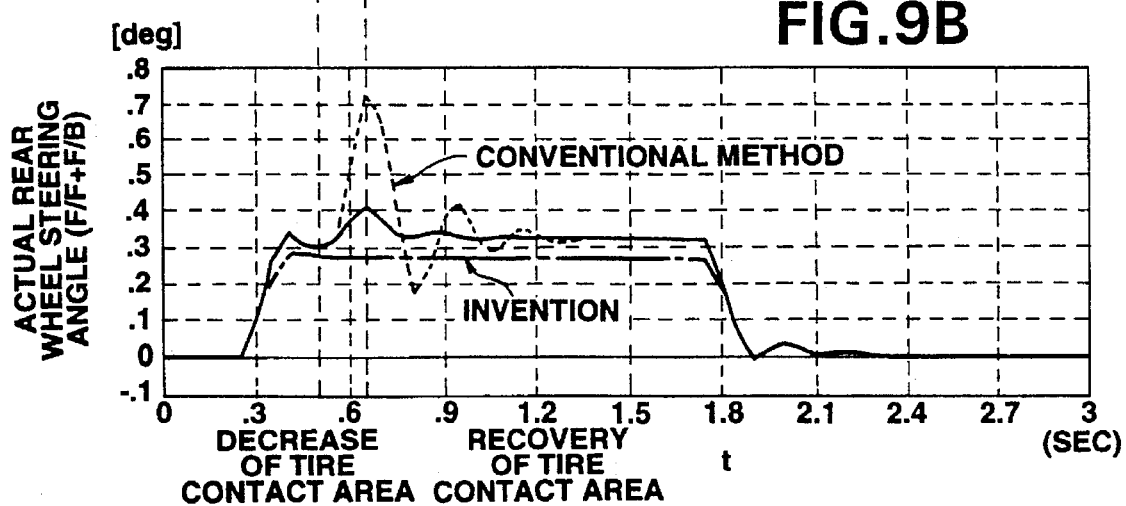
Figure 9C:
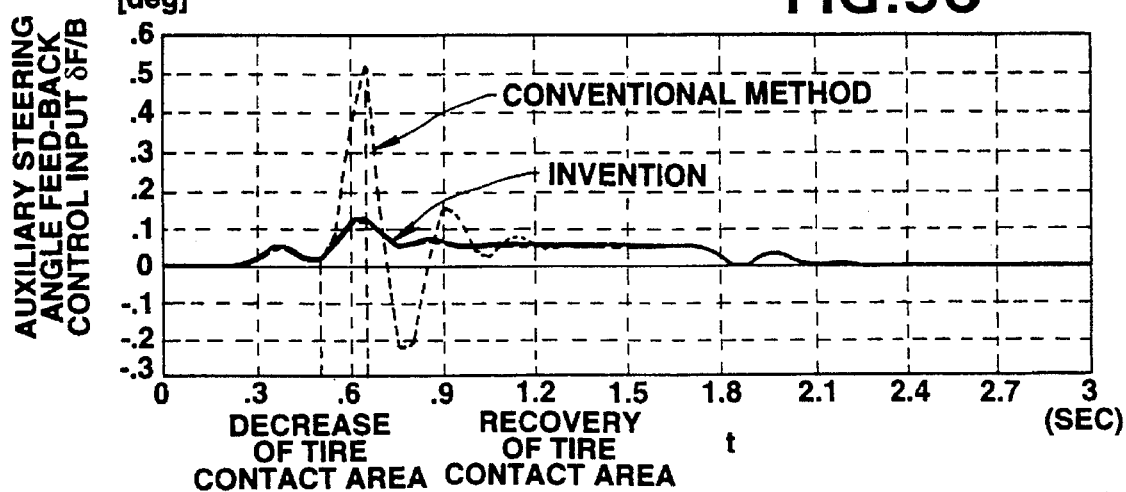

FIG. 9 shows a generated yaw rate characteristic chart, a rear wheel steering angle characteristics chart, and an auxiliary steering angle feedback control-input characteristic chart. In these charts continuous line shows characteristics in case that the contact area of the tires to road surface is constant. A broken line shows a characteristic chart of a conventional method where the contact area of tires of the wheels is varied according to the road condition. An alternate long and short dash line shows a characteristic chart of the method according to the present invention where the contact area of the tires is varied according to the road condition.

The result of the simulation indicates that in case the contact area of the tires is constant, it is possible to suppress the generation of the yaw rate caused by the disturbance by means of a feedback control. However, in case that the contact area of the tires is varied by bumps on the road surface (during a period from 0.5 second point to 0.65 second point, tire contact feeling is lost), if the feedback control is executed directly, the generated yaw rate is largely varied at a time that the contact of tires is recovered. Therefore, a driver of the vehicle receives strange feeling. In contrast, according to the present invention, the auxiliary steering angle feedback control-input $\delta F/B$ is decreasingly corrected. Accordingly, when the tire contact is recovered, the generated yaw rate is smoothly converged into a predetermined generated yaw rate level. This prevents the generation of strange feeling.

With the thus arranged auxiliary steering angle control system, the road condition detecting section 24 is provided to detect the correction factor Kp for correcting the auxiliary steering angle feedback control-input $\delta F/B$, and the auxiliary steering angle feedback control-input correcting section 25 is provided to decrease the auxiliary steering angle control-input $\delta F/B$ according to the road condition. Therefore, even during a road including a bad-conditioned surface, a driver of a vehicle equipped with this system can continue driving without having a strange feeling.

Furthermore, since the road condition detecting section 24 is arranged to detect a road variable from the degree of high-frequency component included in the detected yaw rate signal, this system according to the present invention ensures a merit in a cost.

While the embodiment of the present invention has been shown and described according to the drawings, it will be understood that the invention is not limited by any of the details of description and that various changes and modifications may be made in the invention without departing from the spirit and scope thereof.

Although in the embodiment of the invention the control system has been applied to the rear wheels, it will be understood that the invention is applicable to a front-wheel auxiliary steering control system and a four-wheel auxiliary steering control system. Further, although the yaw rate has been used as a vehicle motion variable in the embodiment of the invention, a lateral acceleration, a side velocity or a yaw rate plus a side velocity may be used as a vehicle motion variable. Also, while in the embodiment of the invention the auxiliary steering angle has been controlled by the feedforward control plus feedback control, the auxiliary steering angle may be controlled only by the feedback control.

Furthermore, although the preferred embodiment of the present invention has been shown and described such that the road condition is calculated from the yaw rate, it will be understood that a vertical vibration detector may be applied to a means for detecting a road condition.

What is claimed is:

1. An auxiliary steering angle control system for a vehicle, comprising:

vehicle condition detecting means for detecting a vehicle condition;

desired vehicle motion variable calculating means for calculating a desired value of the vehicle motion variable actually generated to the vehicle from the detected vehicle condition;

actual vehicle motion variable detecting means for detecting an actual vehicle motion variable actually generated in the vehicle;

auxiliary steering angle feedback control-input determining means for determining an auxiliary steering feedback control-input according to the difference between the desired motion variable and the detected actual vehicle motion variable;

road condition detecting means for detecting a road variable indicative of a condition of a road on which the vehicle is traveling; and auxiliary steering feedback control-input correcting means for reducing the auxiliary steering angle feedback control-input when said road condition detecting means outputs a signal indicative that the vehicle is traveling on a bad-conditioned road.

2. An auxiliary steering angle control system as claimed in claim 1, wherein said road condition detecting means detects a degree of a bumpiness of the road as said road condition.

3. An auxiliary steering angle control system as claimed in claim 1, wherein said road condition detecting means includes means for extracting high-frequency component in the signal from said actual vehicle motion variable detecting means and for detecting the road condition from the extracted high-frequency component.

4. An auxiliary steering angle control system as claimed in claim 1, wherein said vehicle condition detecting means includes a steering angle sensor and a vehicle speed sensor, and said actual vehicle motion variable detecting means includes a yaw rate sensor.

5. An auxiliary steering angle control system as claimed in claim 1, wherein said road condition detecting means includes a yaw rate sensor.

6. An auxiliary steering angle control system as claimed in claim 2, wherein the means for detecting the road condition from the extracted high-frequency component judges the road condition according to a degree of the high-frequency component included in the signal indicative of the yaw rate.

7. An auxiliary steering angle control system as claimed in claim 1, further comprising auxiliary steering angle feed-forward control-input calculating means for calculating an auxiliary steering feed-forward control-input according to the desired vehicle motion variable.

8. A road-condition evaluating apparatus for a vehicle control system, comprising:

a yaw rate sensor detecting a yaw rate generated in a vehicle during a traveling and outputting a signal indicative of the yaw rate;

a filter extracting as high-frequency component from the signal from the yaw rate sensor; and a processor calculating a road variable indicative of a road condition by using a predetermined equation and a value indicative of the high-frequency component obtained in said filter.

9. An auxiliary steering angle control system for steering a pair of rear wheels for a four wheel steered vehicle, said auxiliary steering angle control system comprising:

vehicle condition detecting means for detecting a vehicle condition and generating a vehicle motion variable;

desired vehicle motion variable calculating means for calculating a desired value of the vehicle motion variable actually generated to the vehicle from the detected vehicle condition;

actual vehicle motion variable detecting means for detecting an actual vehicle motion variable actually generated in the vehicle;

auxiliary steering angle feedback control-input determining means for determining an auxiliary steering angle feedback control-input according to a difference between the desired value of the vehicle motion variable and the detected actual vehicle motion variable;

road condition detecting means for detecting a road variable indicative of a condition of a road on which the vehicle is traveling; and auxiliary steering feedback control-input correcting means for reducing the auxiliary steering angle feed back control-input when said road condition detecting means outputs a signal indicative that the vehicle is traveling on a bad-conditioned road.

10. An auxiliary steering angle control system for steering a pair of rear wheels for a four wheel steered vehicle, said auxiliary steering angle control system comprising:

vehicle condition detecting means for detecting a vehicle condition and generating a vehicle motion variable;

desired vehicle motion variable calculating means for calculating a desired value of the vehicle motion variable actually generated to the vehicle from the detected vehicle condition;

actual vehicle motion variable detecting means for detecting an actual vehicle motion variable actually generated in the vehicle;

auxiliary steering angle feedback control-input determining means for determining an auxiliary steering angle feedback control-input according to a difference between the desired value of the vehicle motion variable and the detected actual vehicle motion variable;

road condition detecting means for detecting a road variable indicative of a condition of a road on which the vehicle is traveling, said road condition detecting means including:

a yaw rate sensor for detecting a yaw rate generated in the vehicle during traveling and outputting a signal indicative of the yaw rate, a filter for extracting a high-frequency component from the signal outputted from the yaw rate sensor, and a processor which calculates a road variable indicative of a road condition by using a predetermined equation and a value indicative of the high-frequency component extracted by said filter; and auxiliary steering feedback control-input correcting means for reducing the auxiliary steering angle feed back control-input when said road condition detecting means outputs a signal indicative that the vehicle is traveling on a bad-conditioned road.

* * * * *